United States Patent [19]

Harris

[11] 4,129,427
[45] Dec. 12, 1978

[54] APPARATUS FOR CONTACTING AN AEROSOL STREAM WITH A LIQUID

[75] Inventor: James L. Harris, Westfield, N.C.

[73] Assignee: R. J. Reynolds Tobacco Company, Winston-Salem, N.C.

[21] Appl. No.: 840,864

[22] Filed: Oct. 11, 1977

[51] Int. Cl.² ............................................. B01D 47/02
[52] U.S. Cl. ...................................... 55/247; 55/256; 55/269; 261/89; 261/152
[58] Field of Search .......................... 55/247, 267–269, 55/159, 199, 244, 256; 261/89, 90, 152, 155; 210/75, 77

[56] References Cited

U.S. PATENT DOCUMENTS

| | | | |
|---|---|---|---|
| 1,062,446 | 5/1913 | Ernst | 261/89 X |
| 1,707,548 | 4/1929 | Brassert et al. | 261/89 |
| 1,767,628 | 6/1930 | Maltitz | 261/89 |
| 1,798,822 | 3/1931 | Wagner | 261/90 |
| 1,840,654 | 1/1932 | Brassert et al. | 261/90 |
| 2,061,043 | 11/1936 | Philip | 261/152 X |
| 2,314,986 | 3/1943 | Johnson | 55/247 X |
| 3,477,575 | 11/1969 | Nemec et al. | 210/77 X |
| 3,506,245 | 4/1970 | Noschinski et al. | 261/89 X |
| 4,066,546 | 1/1978 | Sasaki | 210/75 |

FOREIGN PATENT DOCUMENTS

| | | | |
|---|---|---|---|
| 844922 | 8/1960 | United Kingdom | 55/247 |
| 889279 | 2/1962 | United Kingdom | 55/247 |

Primary Examiner—Richard L. Chiesa
Attorney, Agent, or Firm—Herbert J. Bluhm; Manford R. Haxton

[57] ABSTRACT

A stationary elongated vessel of substantially circular cross section having side walls and end closures is provided with a plurality of rod-like projections rigidly secured to and extending radially inwardly from the side walls at predetermined locations. A rotatably supported shaft concentrically positioned within the vessel is provided with a plurality of finger-like appendages rigidly secured thereto and extending radially outwardly from predetermined locations on the sides of the shaft. Support means maintain the concentric position of the shaft and restrict axial movement of the shaft so that the finger-like appendages intermesh with the rod-like projections in non-contacting relationship during rotation of the shaft. Inlet and outlet means are provided to introduce into and withdraw from the vessel liquids and aerosol streams. Rotation of the shaft at appropriate speeds provides effective contact between the liquid medium and the aerosol stream in the vessel.

13 Claims, 5 Drawing Figures

APPARATUS FOR CONTACTING AN AEROSOL STREAM WITH A LIQUID

BACKGROUND OF THE INVENTION

The present invention relates to apparatus for effecting intimate contact of an aerosol stream with an agitated body of liquid. More specifically, this invention provides means for the removal of certain components from an aerosol stream by the process of absorption of condensation resulting from intimate contact of the aerosol stream with a body of liquid. Thus, for example, the apparatus disclosed herein may be used as a collection device for constituents of an aerosol stream which are soluble in a particular liquid medium. The resulting liquid medium containing the dissolved constituents from the aerosol stream may then be subjected to various routine chemical analyses. A modification of the presently disclosed apparatus finds use as a scrubber for the continuous removal of pollutants from an industrial gas stream.

Removal of constituents from an aerosol stream by a liquid requires intimate contacting of the aerosol stream and the liquid. The prior art discloses various means for promoting such intimate contacting. These means include, for example, the passage of an aerosol stream through a chamber into which the liquid is continuously sprayed and vessels containing plates or packing continuously wetted with the liquid which provide large wetted surface areas for contacting the aerosol stream passing through the vessels. While the prior art means are generally effective for removing constituents from aerosol streams, the composition of certain aerosols as well as space availability and operating limitations may render prior art devices unsuitable in many instances.

SUMMARY OF THE INVENTION

The present invention provides a compact and highly efficient apparatus for contacting aerosol streams with a liquid. The apparatus is also readily disassembled for cleaning. Basically, the apparatus comprises a stationary elongated vessel of substantially circular cross section having side walls and end closures, inlet and outlet means for introducing into and discharging fluids from the vessel, a plurality of rod-like projections rigidly secured to and extending radially inwardly from the side walls at predetermined locations, a rotatably supported shaft concentrically positioned within the vessel and provided with a plurality of finger-like appendages rigidly secured thereto and extending radially outwardly from predetermined locations on the sides of the shaft, support means for maintaining the position of the shaft in concentric relationship with respect to the elongated vessel and for restricting axial movement of the shaft so that the finger-like appendages intermesh with the rod-like projections in non-contacting relationship during rotation of the shaft, and means for rotating said shaft at an effective rotational speed while an aerosol stream is passed through the vessel.

In a particularly preferred embodiment of the invention the elongated vessel is partially enclosed by a housing which surrounds at least a portion of the side walls of the vessel. The chamber defined by the housing, the side walls of the vessel and suitable sealing means between the housing and side walls is provided with inlet and outlet means to permit passage of a heat exchange fluid through the chamber. The use of a heat exchanging fluid in this preferred embodiment allows the liquid in the elongated vessel to be maintained at a desired temperature.

DESCRIPTION OF THE PREFERRED EMBODIMENT

Figure 1:
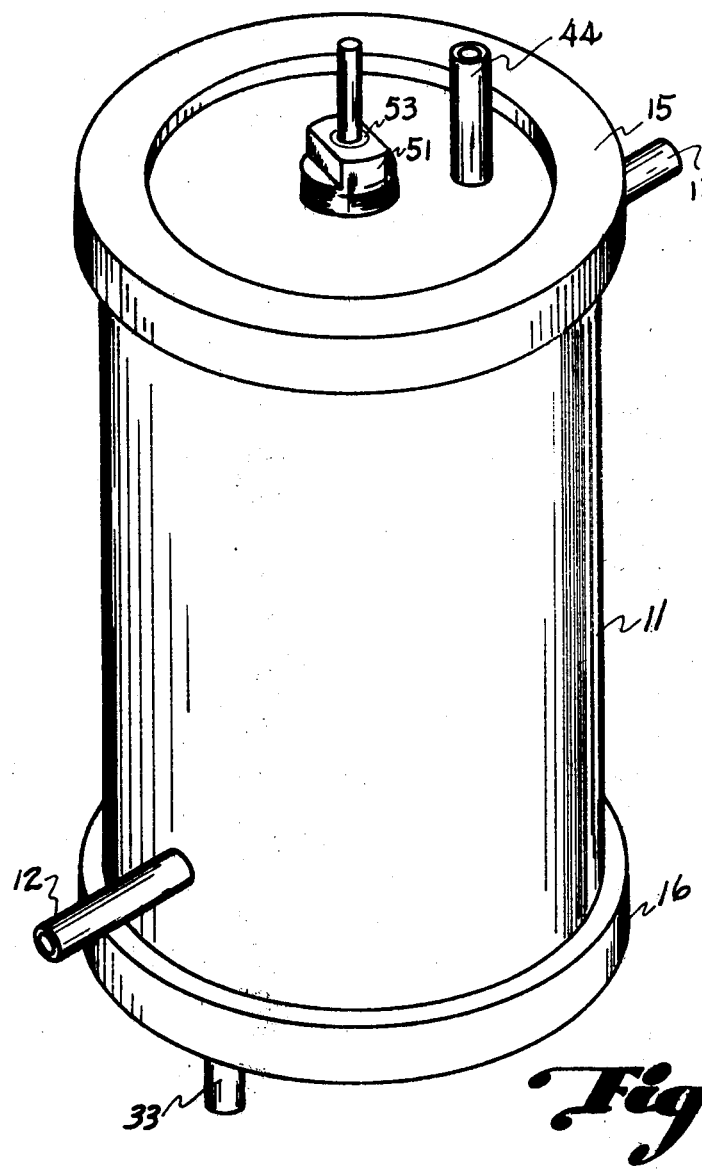
FIG. 1 is a perspective view of a preferred embodiment of the present invention in its assembled form.

An embodiment of the present invention is shown in assembled form in FIG. 1. A generally cylindrical housing 11 with inlet tube 12 and outlet tube 13 together with end closures inserted in sealing relationship into each end of the cylindrical housing constitutes the outer shell of annular chamber 17 (FIG. 2) through which a heat exchange fluid such as water may be passed. Threaded retaining rings 15 and 16 screw onto each end of cylindrical housing 11 to hold the end closure in place during operation of the apparatus.

Figure 2:
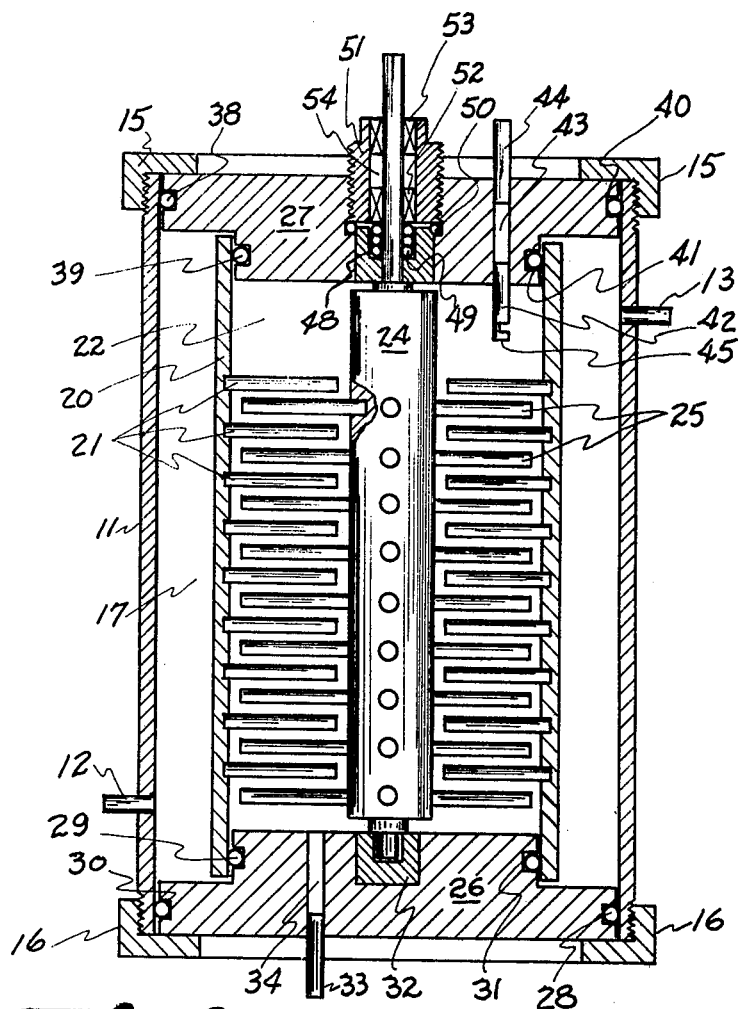
FIG. 2 is a sectional view of the apparatus shown in FIG. 1 taken generally along a plane which passes through the longitudinal axis of the apparatus.

The arrangement of the various components of the apparatus is shown in greater detail in FIG. 2. Concentrically positioned within cylindrical housing 11 is a second generally cylindrical member 20 which has a plurality of rod-like projections 21 rigidly secured to the walls at predetermined locations. The rod-like projections 21 extend radially inwardly from and may be secured to the walls of cylindrical member 20 by suitable means such as by welding or by threaded mounting holes in the walls of member 20. The mounting holes for rod-like projections 21 may pass completely through the walls of member 20 provided that appropriate sealing means are used to prevent any fluids from migrating between annular chamber 17 and contacting chamber 22.

A rotatably supported shaft 24 is concentrically positioned within cylindrical member 20. Shaft 24 is provided with a plurality of finger-like appendages 25 which extend radially outwardly from predetermined locations on the sides of the shaft. Appendages 25 are rigidly secured to shaft 24 by suitable means such as by welding or by threaded mounting holes.

The relative positions of shaft 24, cylindrical member 20 and cylindrical housing 11 in the assembled apparatus are maintained by cooperating end closures 26 and 27. First end closure 26 is substantially circular and of sufficient thickness to permit a stepped arrangement for accommodating simultaneously cylindrical housing 11 and cylindrical member 20. First end closure 26 engages the inner walls of cylindrical housing 11 and cylindrical member 20 by means of sealing O-rings 28 and 29, respectively. Grooves 30 and 31 are provided to maintain O-rings 28 and 29, respectively, in a relatively fixed position on the peripheral edges of stepped end closure 26.

First end closure 26 is also provided with a cavity in the central portion of the surface area facing contacting chamber 22 in which bearing means 32 are disposed. Bearing means 32 may take the form of a cup fabricated from polytetrafluoroethylene or other suitable material or it may comprise an appropriate bearing assembly. Inlet tube 33 and passageway 34 provide means for introducing fluids into contacting chamber 22.

Second end closure 27 is also constructed with a stepped arrangement and includes sealing O-rings, 38 and 39 disposed in grooves 40 and 41, respectively. O-rings 38 and 39 contact the inner walls of cylindrical housing 11 and cylindrical member 20, respectively, to provide a fluid-tight seal. Passageway 43 through end closure 27 connects outlet tubes 42 and 44 to provide means for discharging fluids from contacting chamber 22. Tube 42 is provided with end cap 45 which serves to deflect liquid droplets which might otherwise enter tube 42 due to the vigorous stirring action in contacting chamber 22 during operation of the apparatus.

The central portion of the circularly shaped end closure 27 is provided with an opening through which an extension of shaft 24 passes. This extension of shaft 24 passes through suitable bearing and sealing means and is of sufficient length to protrude from the body of the apparatus so as to permit attachment of an appropriate source of rotational power (not shown). In the preferred embodiment shown in the drawings, the bearing and sealing means comprise a sleeve 48 fabricated from polytetrafluoroethylene or other suitable material, O-rings 49 and 50, and threaded plug 51 which has a central opening into which brass sleeves 52 and 53 are introduced. The extension of shaft 24 passing through brass sleeves 52 and 53 forms an annular chamber 54 which serves as a reservoir for lubricating oil. Sleeve 48 is fabricated so that one end thereof has an inside diameter approximating the diameter of the extension of shaft 24 while the other end of sleeve 48 has an inside diameter large enough to accommodate O-rings 49. The portion of sleeve 48 having the larger inside diameter will be determined by the number of O-rings 49 required for sealing purposes. Sealing is accomplished by O-rings 49 and 50 as they are compressed by threaded plug 51 as it is screwed into the threaded opening in second end closure 27.

Figure 3:
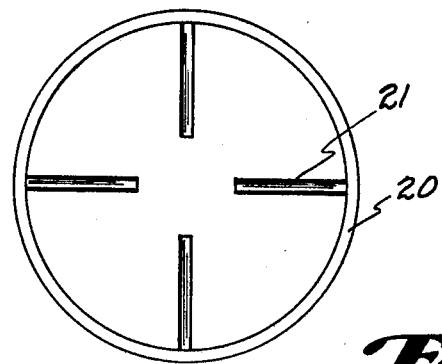
FIG. 3 is an end view of the inner cylindrical element shown in FIG. 2.
Figure 4:
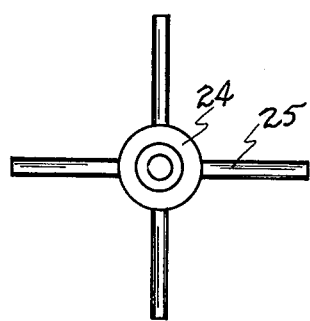
FIG. 4 is an end view of the rotating shaft member shown in FIG. 2.

The number, length, shape, size and position of rod-like projections 21 and finger-like appendages 25 may vary depending on the efficiency required for a particular use. Obviously, the maximum effective length of projections 21 and appendages 25 must be slightly less than the distance between the inside surface of cylindrical member 20 and shaft 24 as measured by a line that is coaxial with a given projection 21 or appendage 25. The shape of projections 21 and appendages 25 is not critical and may, for example, be round, square, triangular, or oblong with either smooth or rough surfaces such as corrugated and striated. The size or gauge of the material from which projections 21 and appendages 25 are fabricated should be such that no significant deformation thereof will occur during operation of the apparatus. The intermeshing nature of projections 21 and appendages 25 require that they be spaced at appropriate intervals along the longitudinal axes of cylindrical member 20 and shaft 24. In the apparatus depicted in the drawings, there are four projections 21 per "set" and four appendages 25 per "set" at each longitudinal location as indicated by the end views in FIG. 3 and FIG. 4, respectively. It is necessary to provide sufficient clearance between adjacent "sets" of projections 21 and appendages 25 so that no physical contact will occur between them when shaft 24 is rotated during operation of the apparatus. Generally speaking, smaller clearances between adjacent "sets" result in more efficient removal of components in an aerosol stream that is passed through contacting chamber 22. The minimum length and total number of projections 21 and appendages 25 will depend to a large extent on the degree of agitation that is required for a given aerosol stream. Preferably, there should be at least two and most preferably at least four projections 21 or appendages 25 per "set." It is also preferred that where more than one "set" of projections 21 and one "set" of appendages 25 are employed, the "sets" of projections 21 be alternated with the "sets" of appendages 25. FIG. 2, for example, shows a total of nine "sets" of alternating projections 21 and appendages 25 with each "set" disposed in a separate plane that is essentially perpendicular to the longitudinal axis of shaft 24.

FIG. 2 shows projections 21 and appendages 25 as substantially straight elements installed perpendicularly to the side walls of cylindrical member 20 and the longitudinal axis of shaft 24. It is to be understood, however, that these elements may also be curved provided that they are properly oriented when installed and appropriately spaced from adjacent elements to prevent physical contact in the assembled apparatus. These elements may also be installed at an angle to the longitudinal axes of cylindrical member 20 and shaft 24. It is apparent that installation of these elements may be quite varied with respect to their number, length, shape, size and position so long as physical contact between the elements is avoided and sufficient agitation is achieved during operation of the apparatus.

The materials from which the apparatus is fabricated will depend on the desired size and use. Generally speaking, metals such as stainless steel, copper, brass and combinations thereof are preferred for fabrication although certain thermoplastic resins such as the polyacrylics or polycarbonates may be used for units of smaller size. The O-rings which serve as sealing gaskets may be of synthetic rubber such as the commercially available O-rings fabricated from butadiene-acrylonitrile copolymer.

Operation of the assembled apparatus depicted in FIG. 2 involves introducing via tube 33 a liquid such as water, an organic solvent, a solution of one or more chemical compounds which will react with some of the aerosol constituents, and combinations of liquids into contacting chamber 22. The volume of liquid introduced should not exceed approximately 80 percent of the total effective volume of chamber 22. The minimum volume of liquid required in chamber 22 will depend on the flow rates and total volume of the aerosol stream introduced into chamber 22 through tube 33 and the desired efficiency of the liquid medium at the operating temperatures selected in removing and retaining particular constituents of the aerosol stream. As a rule liquid volumes equivalent to at least 10 percent and, preferably, to about 35 to 65 percent of the total effective volume of the contacting chamber are required and the total volume of the aerosol stream passed through the contacting chamber should be limited so that the capacity of the liquid to remove and retain aerosol constituents of interest will not be exceeded. During passage of the aerosol through the contacting chamber 22, shaft 24 is rotated at a sufficient number of revolutions per minute to provide vigorous agitation of the liquid. This vigorous agitation is necessary to ensure that the relatively large aerosol gas bubbles rising through the liquid medium in chamber 22 are subdivided into very small bubbles thereby promoting more intimate contact between the liquid medium and the aerosol constituents. The minimum rotational speed of shaft 24 is determined by the amount of turbulence desired which, in turn, is dependent upon the size of chamber 22 and the number of appendages 25 on shaft 24. All other factors being equal, it is apparent that as the diameter of chamber 22 is increased the rotational speed of shaft 24 can be decreased while the turbulence generated remains the same. The temperature of the liquid in chamber 22 is maintained by passing a heat exchange fluid such as water, alcohol or brine through annular chamber 17 via inlet tube 12 and outlet tube 13. After aerosol flow through chamber 22 has been stopped, the rotation of shaft 24 is discontinued and the liquid containing the aerosol constituents is withdrawn from chamber 22 via passageway 34 and tube 33 for subsequent analysis.

Figure 5:
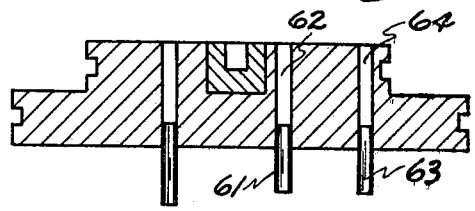
FIG. 5 is a cross sectional view of a second preferred embodiment of the lower end closure shown in FIG. 2.

The apparatus shown in FIG. 2 can also be used as a gas scrubber by following the operating procedure described above. Obviously, the liquid introduced into chamber 22 may contain chemical reactants which selectively remove certain constituents from the influent gas stream. If fully continuous gas scrubbing operation is desired, the apparatus of FIG. 2 can be modified so that the liquid medium in chamber 22 can be continuously introduced and withdrawn. FIG. 5, for example, shows a modification of first end closure 26 wherein inlet tube 61 and passageway 62 along with outlet tube 63 and passageway 64 provide means for introducing and withdrawing the liquid. The volume of liquid maintained in chamber 22 under such continuous operation can be controlled by suitable means including regulation of influent and effluent flow rates at identical rates. Also, the use of continuous liquid flow through contacting chamber 22 may make the use of housing 11 and associated structures unnecessary for heat exchange purposes.

The pressure drop required for moving an aerosol stream through contacting chamber 22 will depend on a number of factors including the size of the chamber, the size of the inlet and outlet tubes, the density and height of the liquid in the contacting chamber and the composition of the aerosol stream. All other factors being the same, the pressure drop across the contacting chamber will generally be less when shaft 24 is being rotated as compared with the pressure drop due to the static head of liquid in the chamber. For example, apparatus similar to FIG. 2 in which the contacting chamber inside diameter was 5.1 centimeters and contained approximately 50 milliliters of water exhibited the following pressure drop when a stream of air was passed through the chamber at a flow rate of about 30 milliliters per second:

| Rotational Speed of Shaft in Revolutions per Minute | Pressure Drop in cm. of Water |
| --- | --- |
| No rotation | 6.4 |
| 846 | 5.9 |
| 1764 | 5.2 |
| 3132 | 5.9 |

The following examples further illustrate the use of the presently disclosed invention as a collection device for the tobacco smoke.

EXAMPLE 1

Apparatus similar to that depicted in FIG. 2 was constructed. It consisted of a stainless steel shaft 19 mm in diameter by 67 mm in length with 6 mm diameter extensions on either end measuring about 10 mm and 76 mm, respectively. Holes of appropriate size were drilled into the 19 mm diameter portion of the shaft to accommodate short stainless steel rods 3 mm in diameter and of sufficient length to extend about 14 mm from the surface of the shaft after pressure fit mounting in the drilled holes. The steel rods were equally spaced around the periphery of the shaft four sets of eight rods each and one set of four rods located adjacent the end of the shaft having the 10 mm extension of reduced diameter. The sets of rods were spaced approximately 13 mm apart center to center.

A stainless steel pipe having an inside diameter of about 51 mm, a length of about 80 mm and a wall thickness of approximately 3 mm was provided with 32 threaded openings for receiving 8-32 stainless steel screws 19 mm in length. The threaded openings were arranged in four sets of eight openings each around the periphery of the pipe with the sets of openings spaced approximately 13 mm apart center to center and positioned in cooperating relationship with respect to the sets of rods extending outwardly from the rotating shaft so that the 8-32 screws protruding inwardly through each set of openings would occupy positions intermediate between opposing adjacent sets of rods on the rotating shaft in the assembled apparatus. The 8-32 screws were provided with polytetrafluoroethylene sealing tape to produce a fluid tight seal when the screws were introduced into the openings from the outside of the pipe and tightened firmly against the sealing tape.

Stainless steel end closures of 25 mm thickness were fabricated as shown in FIG. 2 with 7 mm stainless steel tubing used for the inlet and outlet tubes affixed to the end closures by pressure fit mounting. Cylindrical housing 11 was fabricated from bronze pipe having an inside diameter of 74 mm and a length of 115 mm. The bronze pipe was provided with threaded ends to accommodate the bronze retaining rings 15 and 16.

Approximately 50 milliliters of water was introduced into the contacting chamber 22 of the assembled apparatus by means of inlet tube 33. Total effective volume of chamber 22 was approximately 100 milliliters. Water maintained at a temperature between 20.5° and 22.5° C. was passed through annular chamber 17 and the shaft was rotated 3420 revolutions per minute by coupling the 76 mm shaft extension to a variable speed electric motor. Mainstream smoke from cigarettes smoked on a 20-port smoking machine was then introduced through inlet tube 33 into contacting chamber 22 at an average flow rate of 11.67 ml./sec. The puffing source, connected to outlet tube 44, was a DAB-6 Filamatic Vial Filler manufactured by National Instrument Company. Total volume of smoke introduced was 6300 ml. A Cambridge filter pad located downstream of outlet tube 44 indicated no measurable amount of aerosol emerged from the apparatus even after smoke from 60 cigarettes had been passed through the system. The water in contacting chamber 22 containing absorbed aerosol constituents was withdrawn through tube 33 for subsequent analysis.

EXAMPLE 2

The general procedure of Example 1 was repeated except that the rotational speed of the shaft was varied in order to observe its effect on the efficiency of the apparatus in removing the smoke aerosol. A rotational speed of 2070 RPM revealed small quantities of smoke aerosol that were visually observable as they emerged from the contacting chamber. At rotational speeds of about 2500–3000 RPM only traces of aerosol could be detected exiting from the contacting chamber. No smoke aerosol was detected when the apparatus was operated at rotational speeds in excess of about 3200 RPM.

EXAMPLE 3

Apparatus similar to that described in Example 1 was used for collecting tobacco smoke except that a stainless steel pipe having a length of about 152 mm was used in order to increase the volume of the contacting chamber to approximately 225 milliliters. The lengths of the cylindrical housing and the rotating shaft were also increased proprotionately to accommodate the longer stainless steel pipe.

The contacting chamber was maintained at a temperature of −40° C. by circulating a coolant (absolute ethanol) through annular chamber 17. Fifty milliliters of methylene chloride were introduced into the contacting chamber and the shaft was rotated at 3700 revolutions per minute. After allowing sufficient time for the methylene chloride to be cooled to −40° C., sidestream smoke from a 20-port cigarette smoking machine was introduced into the contacting chamber at a flow rate of 283 ml./sec. by reducing the pressure on the outlet tube of the contacting chamber through the use of an aspirator and a needle valve which controlled the flow of the aerosol into the contacting chamber. The total volume of sidestream smoke introduced was 153,000 milliliters and the residual material collected after removal of methylene chloride and condensed water was 0.98 gram or 49 milligrams per cigarette.

It is apparent that many modifications and variations of the present invention are possible in light of the above teachings. For example, inlet and outlet means for the aerosol stream and the liquid medium may be located in cylindrical member 20 rather than in the end closures. Also, cylindrical member 20 could assume a cup-shaped from and bearing means 32 could be eliminated by supporting shaft 24 in the desired rotational position by appropriate bearing means associated with one end of shaft 24 only. Although the description and examples given above involve operation of the apparatus with its longitudinal axis in a vertical position, the disclosed apparatus would also be effective with the longitudinal axis in a horizontal or inclined position provided that the aerosol inlet and outlet passageways are properly positioned. Those modifications and variations which fall within the spirit of the invention and scope of the appended claims are to be considered part of the invention.

What is claimed is:
1. Apparatus for effecting removal of components from an aerosol stream by intimately contacting said stream with an agitated liquid medium which apparatus comprises:
    (a) a vessel of substantially circular cross section having side walls and first and second end closures in sealing engagement with the side walls with at least one of said end closures being removable;
    (b) a plurality of rod-like projections rigidly secured to and extending radially inwardly from the side walls of said vessel at predetermined locations;
    (c) a rotatably supported shaft concentrically positioned within said vessel and provided with a plurality of finger-like appendages rigidly secured thereto and extending radially outwardly from predetermined locations on the sides of the shaft;
    (d) support means for maintaining the position of said shaft in concentric relationship with respect to the axis of the vessel that is perpendicular to the circular cross section of the vessel and for restricting axial movement of said shaft so that the finger-like appendages intermesh with the rod-like projections in non-contacting relationship during rotation of said shaft;
    (e) a liquid medium disposed in said vessel;
    (f) inlet and outlet means for passing an aerosol stream through said vessel and for introducing the liquid medium into the vessel; and
    (g) means for rotating said shaft at a rotational speed that is effective for removing components from the aerosol stream.
2. The apparatus of claim 1 wherein said vessel is cylindrical and the rod-like projections and finger-like appendages are substantially straight and essentially perpendicular to the side walls of said vessel and the longitudinal axis of said shaft.
3. The apparatus of claim 2 wherein the rod-like projections and finger-like appendages are arranged in sets of at least two projections or appendages per set and each set is disposed in a separate plane that is essentially perpendicular to the longitudinal axis of said shaft.
4. The apparatus of claim 3 wherein at least two sets of rod-like projections are arranged in alternating relationship with at least two sets of finger-like appendages.
5. The apparatus of claim 1 wherein the volume of said liquid medium is equivalent to about 10 to 80 percent of the effective volume of said vessel.
6. The apparatus of claim 1 wherein means separate from said inlet and outlet means are provided for continuously introducing and withdrawing said liquid medium.
7. Apparatus for effecting removal of components from an aerosol stream by intimately contacting said stream with an agitated liquid medium which apparatus comprises:
    (a) a vessel of substantially circular cross section having side walls and first and second end closures in sealing engagement with the side walls with at least one of said end closures being removable;
    (b) housing means of substantially circular cross section surrounding at least a portion of said side walls and in sealing engagement with said vessel to form an annular chamber between said side walls and said housing;
    (c) first inlet and outlet means in said housing for passing a fluid through said annular chamber;
    (d) a plurality of rod-like projections rigidly secured to and extending radially inwardly from the side walls of said vessel at predetermined locations;
    (e) a rotatably supported shaft concentrically positioned within said vessel and provided with a plurality of finger-like appendages rigidly secured thereto and extending radially outwardly from predetermined locations on the sides of the shaft;
    (f) support means for maintaining the position of said shaft in concentric relationship with respect to the axis of the vessel that is perpendicular to the circular cross section of the vessel and for restricting axial movement of said shaft so that the finger-like appendages intermesh with the rod-like projections in non-contacting relationship during rotation of said shaft;

(g) a liquid medium disposed in said vessel;
(h) second inlet and outlet means for passing an aerosol stream through said vessel and for introducing the liquid medium into the vessel; and
(i) means for rotating said shaft at a rotational speed that is effective for removing components from the aerosol stream.

8. The apparatus of claim 7 wherein said vessel is cylindrical and the rod-like projections and finger-like appendages are substantially straight and essentially perpendicular to the side walls of said vessel and the longitudinal axis of said shaft.

9. The apparatus of claim 8 wherein the rod-like projections and finger-like appendages are arranged in sets of at least two projections or appendages per set and each set is disposed in a separate plane that is essentially perpendicular to the longitudinal axis of said shaft.

10. The apparatus of claim 9 wherein at least two sets of rod-like projections are arranged in alternating relationship with at least two sets of finger-like appendages.

11. The apparatus of claim 7 wherein the sealing engagement between said housing means and said vessel comprises portions of said first and second end closures.

12. The apparatus of claim 7 wherein the volume of said liquid medium is equivalent to about 10 to 80 percent of the effective volume of said vessel.

13. The apparatus of claim 7 wherein means separate from said first and second inlet and outlet means are provided for continuously introducing and withdrawing said liquid medium.

* * * * *